E. W. FOTHERGILL.
MACHINE FOR INCLOSING CORDS IN TIRE WRAPPERS.
APPLICATION FILED MAY 22, 1913.
1,104,789.  Patented July 28, 1914.
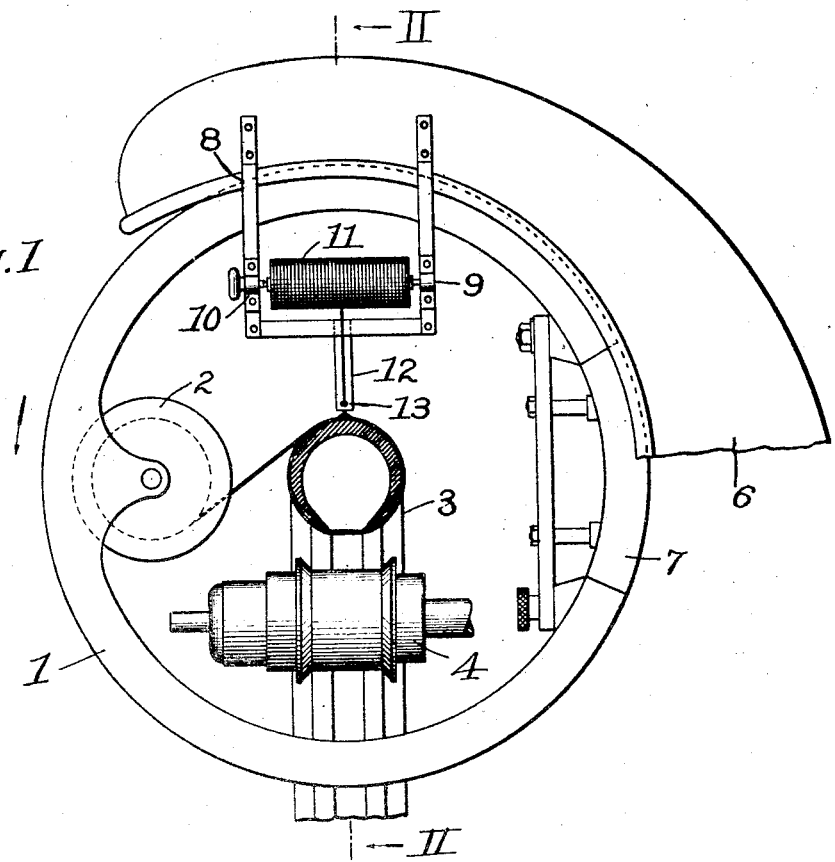
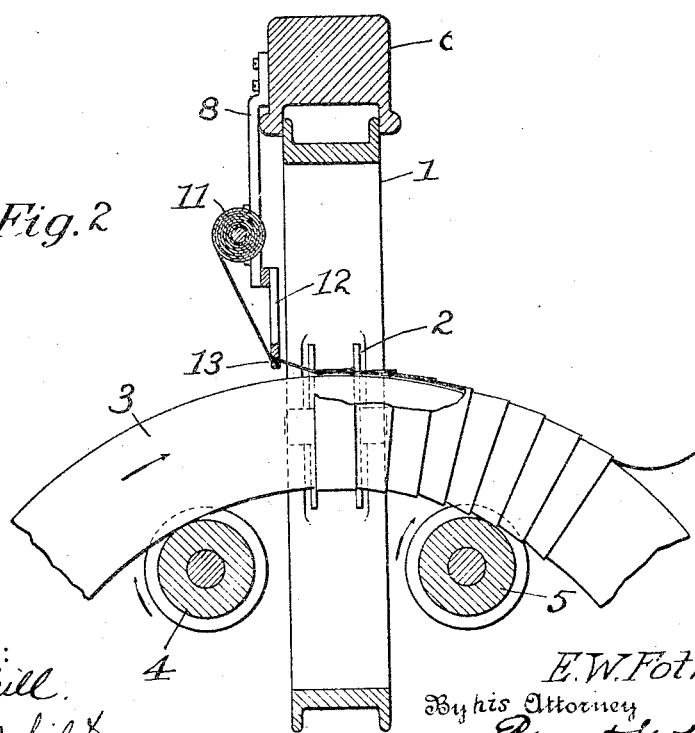
Witnesses:
Edw. W. Vaill.
F. B. Vanderbilt.
Inventor
E. W. Fothergill
By his Attorney
Ernest Hopkinson

UNITED STATES PATENT OFFICE.

EDMUND W. FOTHERGILL, OF HARTFORD, CONNECTICUT, ASSIGNOR TO HARTFORD RUBBER WORKS COMPANY, OF HARTFORD, CONNECTICUT, A CORPORATION OF CONNECTICUT.

MACHINE FOR INCLOSING CORDS IN TIRE-WRAPPERS.

1,104,789. Specification of Letters Patent. Patented July 28, 1914.

Application filed May 22, 1913. Serial No. 769,327.

*To all whom it may concern:*

Be it known that I, EDMUND W. FOTHERGILL, a citizen of the United States, residing in Hartford, county of Hartford, State of Connecticut, have invented certain new and useful Improvements in Machines for Inclosing Cords in Tire-Wrappers, of which the following is a full, clear, and exact disclosure.

This invention relates to machines for wrapping paper or similar material about tire casings to protect the same during transportation and sale, said machine being provided with means for simultaneously inserting or incorporating cord or similar filamentary article by which the said wrapping may be easily removed by pulling said cord.

The object of my invention is to provide an apparatus by which the cord may be inserted between the tire casing and the wrapper during the process of winding the wrapper helically about the tire casing.

For a detailed description of one form of my invention, reference may be had to the following specification and to the accompanying drawing forming a part thereof, in which:

Figure 1 is a side elevation of the wrapping device, showing my improvement applied thereto; and Fig. 2 is a vertical sectional view of the same taken substantially on the line II—II, Fig. 1.

In the drawing the numeral 1 indicates the shuttle carrying the spool 2 from which the wrapping material is unwound. These parts are made to revolve about the tire casing 3 in any suitable manner known in the art, the tire being supported upon the spindles 4 and 5 and the shuttle being retained within the shuttle-guide 6. The shuttle 1 is provided with the usual cut-out segment 7 to allow the insertion and removal of the tire. Upon the upper end of the shuttle guide 6 is attached the frame 8, the lower end of which is provided with bearings 9 and 10 through which pass the axial support for the spool 11 of filamentary material, such as cord or wire. The supports for the spool 11 are so adjusted as to produce a certain amount of friction to prevent the cord from unwinding too easily.

From the lower side of the frame 8 a guide 12 projects and is provided at its lower end with a small hole 13 through which the cord may pass. The lower end of said guide 12 is located close to the outer periphery of the tire so that when the tire is revolved the said cord is laid smoothly upon the surface of the same. It will now be seen that when the shuttle 1 is revolved in the direction of the arrows indicated in Figs. 1 and 2, and the spindles 4 and 5 are rotated in the direction of the arrows shown in Fig. 2, the paper strip will then wrap the tire casing in the usual manner, the cord having been inserted under the first wrapping, the same is caused to follow the surface of the tire and is held in position beneath the wrapper as the wrapping progresses. When the wrapping of the tire is completed, the cord is cut, leaving an exposed end and the tire casing is removed from the machine.

Having thus described one form of my invention, what I claim and desire to protect by Letters Patent is:

1. The combination with a machine for wrapping a strip of fibrous material helically about an annular body, comprising a rotatable annular shuttle, a support for a coil of fibrous material carried thereon, of a support for a spool of filamentary material adjacent said shuttle outside of the plane of rotation thereof, and a guide located adjacent the path of the surface of said annular body for delivering said filamentary material to be inclosed within said fibrous material.

2. The combination with a machine for wrapping a strip of paper tightly about a tire casing, comprising a rotatable annular shuttle, supporting means for the coil of said paper carried thereon, of a support for a spool of filamentary material mounted outside the plane of rotation of said shuttle, and a guide located adjacent the path of the surface of said tire casing for delivering said filamentary material at the point on said casing at which it is to be inclosed with said paper.

Signed at the city of Hartford, county of Hartford, State of Connecticut, this 20th day of May, 1913.

EDMUND W. FOTHERGILL.

Witnesses:
J. LOUISE CARY,
J. T. KROGH,
C. B. WHITTELSEY.